United States Patent [19]

Nakagaki et al.

[11] Patent Number: 5,379,135
[45] Date of Patent: Jan. 3, 1995

[54] OPTICAL SYSTEM FOR DISPLAY APPARATUS

[75] Inventors: Shintaro Nakagaki, Miura; Ichiro Negishi; Tetsuji Suzuki, both of Yokosuka; Fujiko Tatsumi, Yokohama; Ryusaku Takahashi, Yokosuka; Hiroyuki Bonde, Yokohama; Tsutomu Matsumura, Yokosuka, all of Japan

[73] Assignee: Victor Company of Japan, Ltd., Yokohama, Japan

[21] Appl. No.: 35,757

[22] Filed: Mar. 24, 1993

[30] Foreign Application Priority Data

Mar. 24, 1992 [JP] Japan .................. 4-024228[U]

[51] Int. Cl.⁶ .................. G02F 1/13; H04N 9/30
[52] U.S. Cl. .................. 359/40; 359/41; 359/66; 359/72; 359/93; 359/246
[58] Field of Search .................. 359/40, 72, 41, 66, 359/93, 246

[56] References Cited

U.S. PATENT DOCUMENTS

| | | | |
|---|---|---|---|
| 4,707,077 | 11/1987 | Marom | 359/72 X |
| 5,071,230 | 12/1991 | Hatano | 359/72 X |
| 5,083,854 | 1/1992 | Zampolin | 359/40 |
| 5,130,826 | 7/1992 | Takanashi | 359/40 |
| 5,142,387 | 8/1992 | Shikama | 359/41 X |
| 5,142,391 | 8/1992 | Fujiwara | 359/72 X |
| 5,144,463 | 9/1992 | Hatano | 359/72 |
| 5,260,815 | 11/1993 | Takizawa | 359/72 X |

FOREIGN PATENT DOCUMENTS 3-288124 12/1991 Japan .
5-27345 2/1993 Japan .

Primary Examiner—Eugene R. LaRoche
Assistant Examiner—Son Mai
Attorney, Agent, or Firm—Jacobson, Price, Holman & Stern

[57] ABSTRACT

An optical system is disclosed which is for a display apparatus having a light source for emitting read light and a reflection type spatial light modulator for modulating the read light incoming thereto into in accordance with image written thereon. The modulated light is projected onto a screen by a projection lens to display the image. A field lens is provided between the modulator and screen at such a position that both the read and modulated light pass therethrough. The field lens focuses the modulated light on near an entrance pupil of the projection lens so that the intensity of the modulated light is increased.

6 Claims, 4 Drawing Sheets

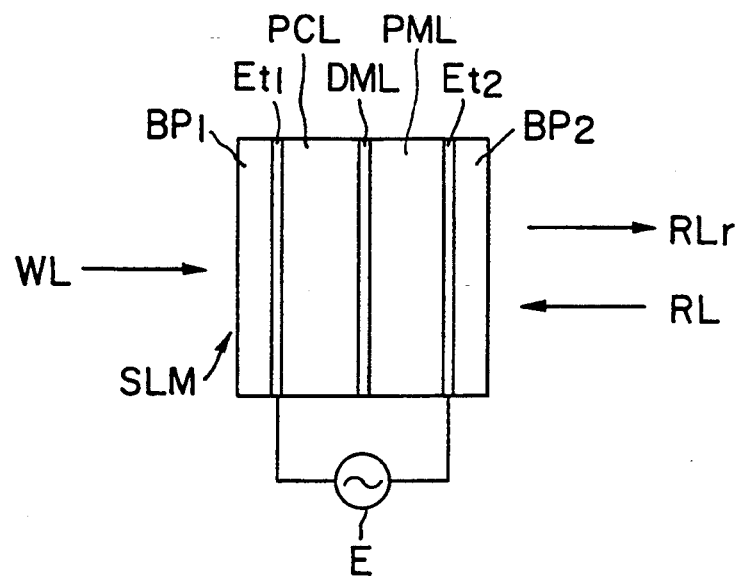
F I G. 1
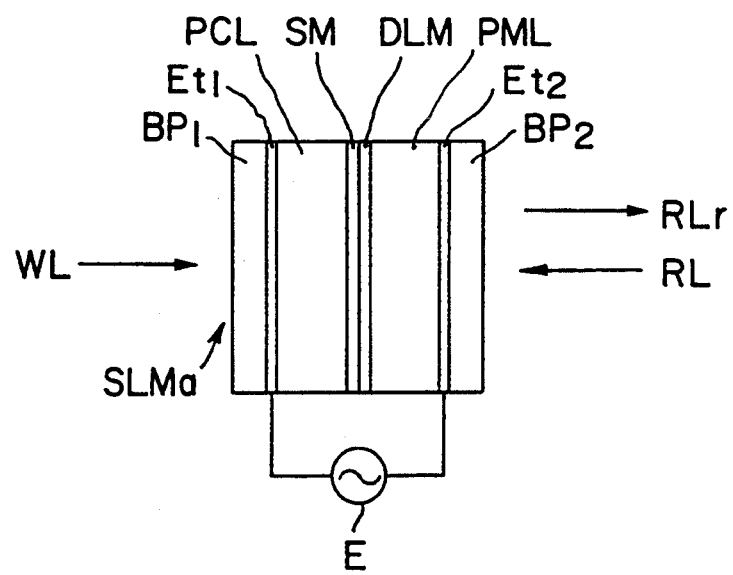
F I G. 2

OPTICAL SYSTEM FOR DISPLAY APPARATUS

BACKGROUND OF THE INVENTION

1. Field of the Invention

The present invention relates to an optical system for a display apparatus.

2. Description of the Prior Art

There have been so far proposed a number of optical systems for a display apparatus such that read light including image information obtained from a reflection type spatial light modulator is allowed to be incident upon a projection lens to obtain a display image on a screen.

In these display apparatuses as described above, an optical system provided with a reflecting mirror is ordinarily adopted to condense read light emitted from a light source on or near an entrance pupil of the projection lens. However, in the case of a small-sized display apparatus such that a lens of a short focal distance is used as the projection lens and further a large bright image is required to be displayed on a screen positioned relatively near the display apparatus for instance, a lamp of high light intensity is needed for the light source. Consequently, the reflecting mirror for condensing the read light emitted from the light source becomes inevitably large in size and long in focal distance.

Therefore, if a lens of a short focal distance is used as the projection lens to reduce the size of the display apparatus, since a reflecting mirror of a long focal distance is to be used, it is impossible to increase the efficiency of the light source utilization, except when the distance between the projection lens and the reflecting mirror is increased. In other words, the efficiency of the light utilization is reduced in the case of the small-sized display apparatus provided with a reflecting mirror of a long focal distance.

In addition, in the case of such a display apparatus that read light emitted from the light source is allowed to be incident upon the reflection type spatial light modulator through a polarization beam splitter arranged on an optical path between the light source and the projection lens; read light including image information and obtained from the reflection type spatial light modulator is allowed to be incident upon the projection lens through the polarization beam splitter to project the read light on the screen through the projection lens, since the extinction ratio of the polarization beam splitter is dependent upon the incident angle, in the case where the incident light rays traveling from the light source to the polarization beam splitter are not parallel to each other, there arise problems in that the contrast ratio of the displayed image decreases and further the efficiency of the light utilization is deteriorated.

In other words, in the case of the optical system including a reflecting mirror for condensing the read light emitted from a light source on or near the entrance pupil of the projection lens, since the read light allowed to be incident upon the refection type spatial light modulator from the light source through the polarization beam splitter becomes convergent rays as a matter of course, the purity of polarization of the read light allowed to be incident upon the reflection type spatial light modulator inevitably drops. Here, the purity of polarization implies the degree in which a polarized light component having a desired polarization plane is pure and therefore not mixed with the other undesired light components.

Accordingly, when the read light obtained from the reflection type spatial light modulator as the light modulated by image information is allowed to be incident upon the polarized beam splitter, the read light obtained through the polarization beam splitter (i.e., the read light whose intensity is modulated according to image information) is low in contrast. In addition, since the polarized light low in the purity of polarization is generated, the efficiency of the light utilization is low.

To overcome the above-mentioned problems, when parallel light is emitted from the light source and then allowed to be incident upon the polarization beam splitter, it is possible to obtain a display image excellent in contrast ratio. In this case, however, there exists another problem in that a telecentric system is required on the incident side of the projection lens, so that the light intensity of the light source becomes non-uniform on the reflection type spatial light modulator (the shading of the light source appears). Further, when the projection lens having an F-number the same as that of the prior art optical system is required to be used, there exists another problem in that a short focal distance is not obtained and additionally the vignetting of oblique beams occurs, thus deteriorating the efficiency of the light utilization.

SUMMARY OF THE INVENTION

Accordingly, the object of the present invention is to provide an optical system for a display apparatus which can display an image excellent in contrast ratio on a screen with the use of a projection lens of a short focal distance.

Further, another object of the present invention is to provide a displaying method which can display an image excellent in contrast ratio by projecting linear polarized light of a high purity of polarization on a screen through a projection lens of a short focal distance.

To achieve the above-mentioned object, the present invention provides an optical system for a display apparatus having a light source for emitting read light; a reflection type spatial light modulator making the read light incoming thereto into modulated light in accordance with an image written thereon by write light; and a projection lens for displaying the image by projecting the modulated light reflected from the reflection type spatial light modulator onto a screen, wherein a field lens is provided between the reflection type spatial light modulator and the screen at such a position that both the read light and the modulated light can pass therethrough, to converge the modulated light on near an entrance pupil of the projection lens.

Further, to achieve the above-mentioned object, the present invention provides a method of displaying an image by applying read light to a reflection type spatial light modulator for generating a charge pattern corresponding to an image to be displayed, modulating the read light according to the charge pattern, and projecting the modulated light reflected from the reflection type spatial light modulator on a screen through a projection lens, comprising the steps of: applying write light including an image to be displayed to the reflection type spatial light modulator to generate the charge pattern in the reflection type spatial light modulator; separating S polarized light from the read light to apply the separated S polarized light to the reflection type spatial light modulator; converging the modulated light reflected from the reflection type spatial light modulator on near an entrance pupil of the projection lens; and changing an incident angle of the write light upon the reflection type spatial light modulator according to position at which an image is displayed on the screen.

BRIEF DESCRIPTION OF THE DRAWINGS

FIG. 1 is a side cross-sectional view showing an example of a reflection type spatial light modulator;

FIG. 2 is a side cross-sectional view showing another example of a reflection type spatial light modulator;

DETAILED DESCRIPTION OF THE PREFERRED EMBODIMENTS

Figure 3:
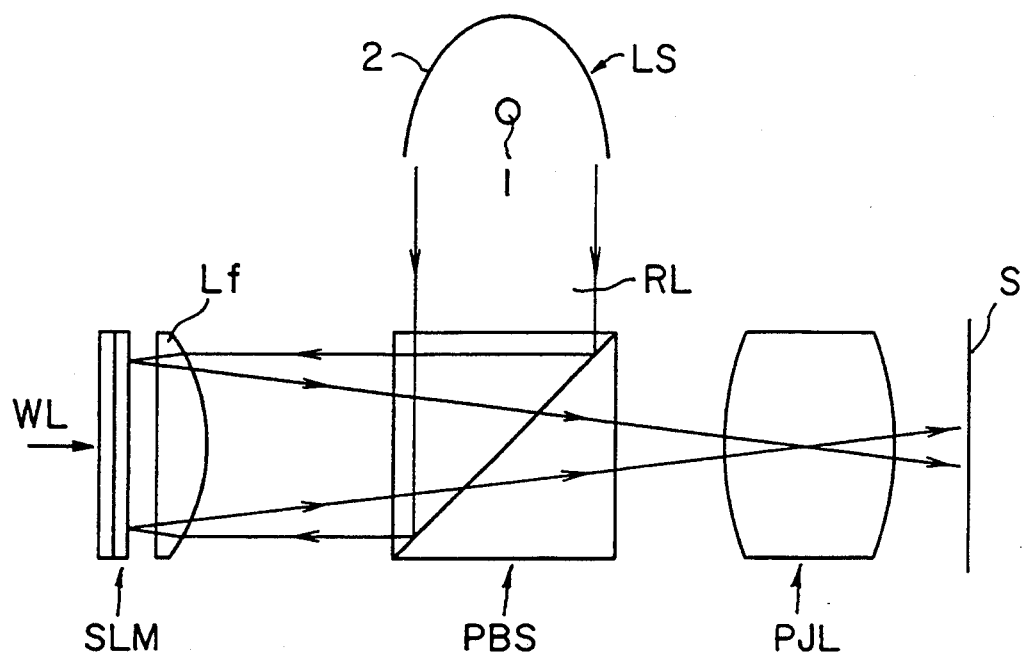
FIG. 3 is a plane view showing a first embodiment of the optical system of the display apparatus according to the present invention.

Embodiments of the optical system of the display apparatus according to the present invention will be described in detail hereinbelow with reference to the attached drawings.

In the respective embodiments, symbols SLM, SLMr, SLMg, and SLMb all denote a reflection type spatial light modulator. Further, the symbol SLMr denotes the reflection type spatial light modulator for a red image obtained when an optical image written into the reflection type spatial light modulator and to be displayed is resolved into three colors; SLMg denotes that for a green image; and SLMb denotes that for a blue image, respectively. Further, SLM denotes the reflection type spatial light modulator used without distinction of colors.

Any type of the reflection type spatial light modulator SLM can be adopted, as far as being composed of at least a photo-modulation layer member and a reflection layer member, for changing the optical condition of a read light allowed to be incident upon the photo-modulation layer member on the basis of an electric field pattern applied to the photo-modulation layer member. The electric field pattern applied to the photo-modulation layer member can be obtained by applying electric signals, by voltage drop generated at a photo-conductive layer member due to the write light incident thereupon, or by applying heat, for instance.

The reflection type light modulator SLM will be described in further detail hereinbelow with reference to FIGS. 1 and 2.

In FIG. 1, the reflection type spatial light modulator SLM is composed of a transparent electrode Et1, a photo-conductive layer member PCL, a dielectric mirror DML for reflecting read light RL, a photo-modulation layer member PML, and a transparent electrode Et2, all laminated in sequence between two transparent substrates BP1 and BP2.

The light modulation layer member PML is formed of such a substance as to change the optical condition according to the intensity distribution of the electric field (described later), for example as lithium niobate monocrystal, liquid crystal layer, macromolecular-liquid crystal composite film, PLZT (lead lanthanum zirconate titanate), etc.

In the case of the reflection type spatial light modulator SLMa shown in FIG. 2, a light shading film SM is additionally laminated between the photoconductive layer member PCL and the dielectric mirror DLM of the reflection type light modulator SLM as shown in FIG. 1. This light shading film SM reflects both the write light WL and the read light RL, respectively.

The transparent substrate BP1 and the electrode Et1 are transparent for the write light WL, and the transparent substrate BP2 and the electrode Et2 are transparent for the read light RL. In the reflection type spatial light modulator SLM and SLMa, a voltage supply E is connected between the two electrodes Et1 and ET2, respectively to apply an electric field across the photoconductive layer member PCL. When write light WL is allowed to be incident thereupon from a light source (not shown) on the side of the electrode Et1, the write light WL reaches the photoconductive layer member PCL passing through the transparent substrate BP1 and the electrode Et1.

The electrical resistance of the photoconductive layer member PCL changes according to the intensity distribution of the write light WL coming thereat. In the case of the reflection type spatial light modulator SLM shown in FIG. 1, there is formed a charge pattern having an intensity distribution corresponding to the intensity distribution of the write light WL reaching a boundary surface between the photoconductive layer member PCL and the dielectric layer member DML. Furthermore, in the case of the reflection type spatial light modulator SLMa shown in FIG. 2, there is formed a charge pattern having an intensity distribution corresponding to the intensity distribution of the write light WL reaching a boundary surface between the photoconductive layer member PCL and the light shading film SM.

In the reflection type spatial light modulator SLM or SLMa in which a charge pattern is formed corresponding to the intensity distribution of the write light WL as described above, when read light RL of a constant intensity is allowed to be incident from a light source (not shown) from the side of the electrode Et2, the read light RL is passed through the photo-modulation layer member PML, reflected from the dielectric mirror DML or the light shading film SM, passed through the same photo-modulation layer member PML again, and emitted from the electrode Et2. In the case where the photo-modulation layer member PML is operative in birefringent mode, the read light RL is emitted from the side of the electrode Et2 as read light (linearly polarized light) RLr whose polarization plane changes according to the charge pattern. Accordingly, the emitted read light RLr is the light whose optical condition changes according to the charge amount distribution of the charge pattern formed in the boundary surface between the photoconductive layer member PCL and the dielectric mirror DML or in the boundary surface between the photoconductive layer member PCL and the light shading film SM.

A first embodiment of the optical system of the display apparatus using the reflection type spatial light modulator SLM (or SLMa) as described above will be described hereinbelow with reference to FIG. 3. The optical system is composed of a light source LS, a polarization beam splitter PBS for obtaining a linearly polarized light from an undefined polarized light emitted from the light source LS, a field lens Lf for transmitting the linearly polarized light to the reflection type spatial light modulator SLM, and a projection lens PJL for projecting the linearly polarized light modulated by the reflection type spatial light modulator SLM on a screen S.

The light source LS is of such a structure that a lamp 1 is disposed at the focal point of a reflecting mirror 2 having a parabolic reflector so that roughly parallel read light can be emitted therefrom.

The field lens Lf transmits the linearly polarized light to the reflection type spatial light modulator SLM, which is disposed at such a position that the linearly polarized light modulated by the reflection type spatial light modulator SLM can be focused near an entrance pupil of the projection lens PJL.

The roughly parallel read light RL of undefined polarized light emitted from the light source LS is allowed to be incident upon the polarization beam splitter PBS. The polarization beam splitter PBS passes P polarized light of the incident read light RL therethrough, but reflects S polarized light of the read light RL therefrom. Therefore, only the roughly parallel S polarized light is allowed to be incident upon the reflection type spatial light modulator SLM through the field lens Lf.

The S polarized light incident upon the reflection type spatial light modulator SLM is light modulated, while going into and returning back from the photo-modulation layer member PML, to which an electric field pattern is applied according to an image to be displayed by allowing the write light WL having image information to be displayed and emitted from a light source (not shown). In more detail, when the S polarized light of the read light incident upon the reflection type spatial light modulator SLM goes and comes back from the portion, at which an electric field corresponding to a black level of an image to be displayed is applied in the photo-modulation layer member, the S polarized light is obtained from the spatial light modulator SLM without polarization, and allowed to be incident upon the field lens Lf. On the other hand, when the S polarized light of the read light incident upon the reflection type spatial light modulator SLM goes and comes back from the portion at which an electric field corresponding to a white level of an image to be displayed is applied in the photo-modulation layer member, the P polarized light is obtained from the spatial light modulator SLM after having been polarized into P polarized light, and then allowed to be incident upon the field lens Lf.

The P polarized light of the read light returned through the field lens Lf is passed through the polarization beam splitter PBS, and focused on or near an entrance pupil of the projection lens PJL. The read light guided into the projection lens PJL is projected on the screen S as an image.

On the other hand, the S polarized light of the read light returned through the field lens Lf is reflected by the polarization beam splitter PBS, without being focused onto the projection lens PJL. Accordingly, the projected image corresponding to the S polarized light passing through the field lens Lf is "black" on the screen S.

The purity of polarization of the P polarized light passed through the polarization beam splitter PBS and that of the S polarized light reflected from the polarization beam splitter PBS both deteriorate as increasing deviation of the incident angle (45 degrees) of the undefined polarization light upon the polarization beam splitter PBS. Further, the polarization purity deteriorates markedly in P polarized light, as compared with S polarized light. Therefore, when the parallel undefined polarized light emitted from the light source is allowed to be incident upon the polarization beam splitter at an incident angle of 45 degrees, the S polarized light reflected by the polarization beam splitter PBS is the S polarized light of an extremely high polarization purity. Accordingly, the linearly polarized light which is introduced into the reflection spatial light modulator SLM, light modulated when coming to and going from the photo-modulation layer member PML, and then returned from the reflection type spatial light modulator SLM can display an image of an excellent contrast ratio.

Here, the linearly polarized light emitted from the reflection type spatial light modulator SLM is allowed to be incident upon the polarization beam splitter PBS under such a condition as to be focused on or at the entrance pupil of the projection lens PJL through the field lens Lf, with the result that the incident angle of the linearly polarized light allowed to be incident upon the polarization beam splitter PBS deviates from 45 degrees. Therefore, the P polarized light incident upon the polarization beam splitter PBS is reflected according to the incident angle, so that light intensity of the P polarized light passed through the polarization beam splitter PBS is reduced by the amount corresponding to the reflected light intensity. On the other hand, the S polarized light incident upon the polarization beam splitter PBS is reflected irrespective of the incident angle upon the polarization beam splitter PBS, so that the intensity of light passed therethrough is small. In other words, the P polarized light passed through the polarization beam splitter PBS is high in polarization purity, thus enabling an image of high contrast ratio to be displayed reliably.

Further, when an object point located away from the optical axis is allowed to be incident at an entrance pupil of a lens at an incident angle of $\omega$, it is well known that the light intensity thereof decreases in proportion to $\cos^4\omega$.

In the present invention, however, since the linearly polarized light returned from the reflection type spatial light modulator SLM is focused near the entrance pupil of the projection lens PJL after the light intensity thereof has been increased through the field lens Lf, it is possible to suppress the reduction of the light intensity in such a way as to decrease in proportion to $\cos^3\omega$, thus improving the efficiency of the light utilization.

Further, in general, when a transmission type spatial light modulator is adopted for the display apparatus of this sort, the field lens is disposed near the read light source.

In contrast with this, in the present invention, the field lens Lf is arranged at such a position near the reflection type spatial light modulator SLM that both the read light incoming to the reflection type spatial light modulator SLM from the light source LS and the read light outgoing from the reflection type spatial light modulator SLM can be passed therethrough; that is, the field lens Lf is positioned so that the read light can be passed therethrough by going and returning.

Here, if the focal distance of the field lens is f/2 in the transmission (prior art) type, since the read light goes to and back from the field lens in the case of the reflection (invention) type, it is possible to obtain a focal distance f twice as long as the prior art focal distance f/2. That is, it is possible to obtain the same light focusing effect as that of the prior art field lens only by a half distance. In other words, it is possible to use a field lens having a large radius of curvature and a thin thickness, as compared with the case of the prior art transmission type, and thereby to reduce the distortion of an image projected by the optical system, while reducing the cost of the field lens.

Further, in the case of the telecentric system, a larger entrance pupil is required for the projection lens. Therefore, where an entrance pupil whose diameter is about twice as large as an object height is necessary, it is extremely difficult to set the focal distance to about the object height, thus there existing a limit of the shorter focal distance in the prior art optical system of the display unit.

In contrast with this, in the present invention, since the optical system is constructed in such a way that the read light reflected from the reflection type spatial light modulator is allowed to be focused on an entrance pupil of the projection lens, the diameter of the entrance pupil upon which the read light is incident can be reduced, thus realizing a shorter focal distance.

A second embodiment of the optical system of a color image display apparatus according to the present invention will be described hereinbelow with reference to FIGS. 4 and 5.

Figure 4:
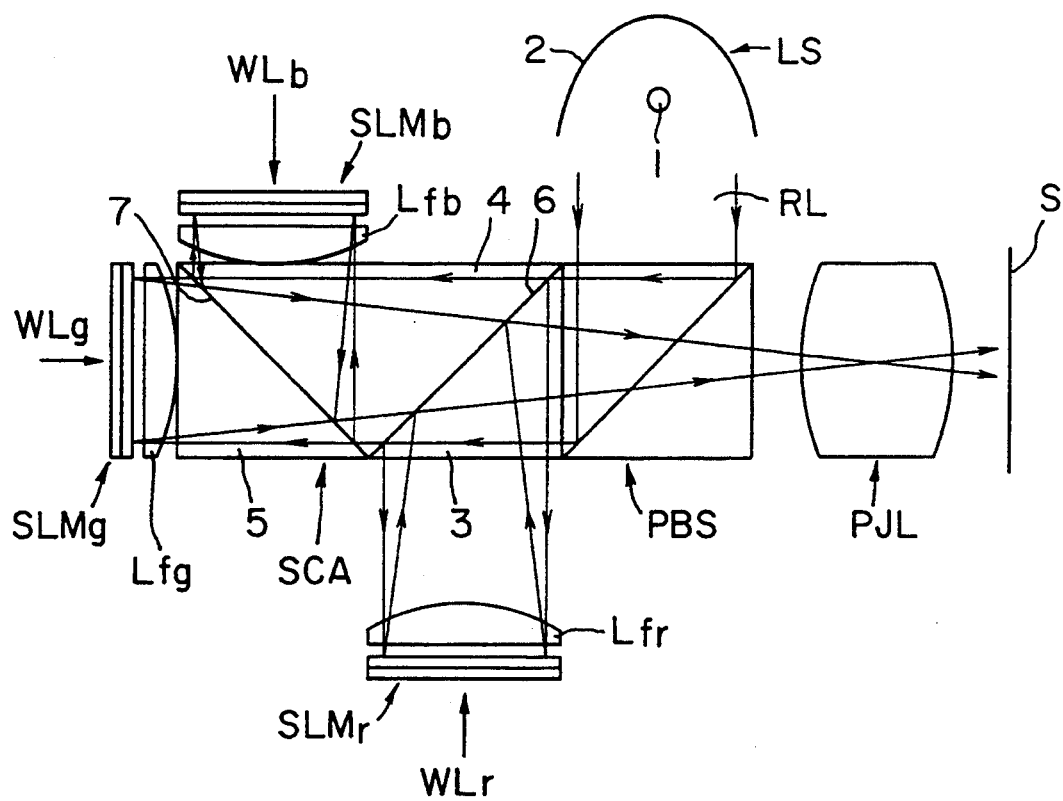
FIG. 4 is a plane view showing a second embodiment of the optical system of the display apparatus according to the present invention.

The optical system shown in FIG. 4 is composed of three reflection type spatial light modulators SLMr, SLMg and SLMb for color images of red, green and blue: three field lens Lfr, Lfg, and Lfb for three color images; and a three color resolving and synthesizing optical system SCA, in addition to the light source Ls, the polarization beam splitter PBS, and the projection lens PJL included in the optical system shown in FIG. 3.

The three-color resolving and synthesizing optical system SCA is of well known type, in which three prisms 3, 4 and 5, a dichroic filter 6 formed at a boundary between the prisms 3 and 4, and a dichroic filter 7 formed at a boundary between the prisms 4 and 5 are all formed integral with each other.

The respective optical elements which constitute the optical system shown in FIG. 4 are arranged in such a way that the read light reflected from the respective reflection type spatial light modulators are synthesized by the three color resolving and synthesizing optical system SCA, and then focused on or near the entrance pupil of the projection lens PJL through the polarization beam splitter PBS, as described later in more detail.

In FIG.4, the read light RL of undefined polarized light emitted from the light source LS are allowed to be incident upon the polarization beam splitter PBS. The S polarized light reflected by the polarization beam splitter PBS is then allowed to be incident upon the prism 3. The light in the green wavelength range of the read light RL is passed through both the dichroic filters 6 and 7, emitted from the end surface of the prism 5, and then allowed to be incident upon the reflection type spatial light modulator SLMg through the field lens Lfg.

Further, the light in the blue wavelength range of the read light RL allowed to be incident upon the prism 3 is passed only through the dichroic filter 6, but reflected from the dichroic filter 7, emitted from the end surface of the prism 4, and then allowed to be incident upon the reflection type spatial light modulator SLMb through the field lens Lfb. Further, the light in the red wavelength range of the read light RL allowed to be incident upon the prism 3 is reflected from the dichroic filter 6, emitted from the end surface of the prism 3, and then allowed to be incident upon the reflection type spatial light modulator SLMr through the field lens Lfr.

In the optical system of the display apparatus as shown in FIG. 4, where the respective reflection type spatial light modulators SMLr, SMLg and SMLr are operative in birefringent mode, the read lights emitted from the respective reflection type spatial light modulators SMLr, SMLg and SMLr are modulated (the polarized planes are changed) on the basis of charge patterns generated by the write lights of the respective color images of red, blue and green emitted from light sources (not shown) for the respective spatial light modulators SLMr, SLMg and SLMb, during when going to and returning back from the respective photo-modulation layer members to each of which an electric field is applied.

The read light RL in the blue wavelength range emitted from the reflection type spatial light modulator SLMb is allowed to be incident upon the prism 4 through the field lens Lfb, reflected from the dichroic filter 7, and is passed through the dichroic filter 6 to be guided to the polarization beam splitter PBS. The P polarized light in the light guided to the polarization beam splitter PBS is passed through the polarization beam splitter PBS and then allowed to be incident upon the projection lens PJL; that is, is focused near the entrance pupil of the projection lens PJL.

The read light RL in the green wavelength range emitted from the reflection type spatial light modulator SLMg is allowed to be incident upon the prism 5 through the field lens Lfg, reflected from the dichroic filters 7 and 6, and further guided to the polarization beam splitter PBS. The P polarized light in the light guided to the polarization beam splitter PBS is passed through the polarization beam splitter PBS and then allowed to be incident upon the projection lens PJL; that is, is focused near the entrance pupil of the projection lens PJL.

The read light RL in the red wavelength range emitted from the reflection type spatial light modulator SLMr is allowed to be incident upon the prism 3 through the field lens Lfr, and then reflected from the dichroic filter 6, and further guided to the polarization beam splitter PBS. The P polarized light in the light guided to the polarization beam splitter PBS is passed through the polarization beam splitter PBS and then allowed to be incident upon the projection lens PJL; that is, is focused near the entrance pupil of the projection lens PJL.

As described above, the respective read lights RL passed through the polarization beam splitter PBS and then guided to the projection lens PJL are the read lights RL reflected from the respective reflection type spatial light modulators SLMr, SLMg and SLMb, synthesized by the three color resolving and synthesizing optical system SCA, and further changed in intensity through the polarization beam splitter PBS. Accordingly, the read lights RL correspond to the color image to be displayed, and therefore it is possible to display a color image on the screen S when projected thereupon.

Figure 5:
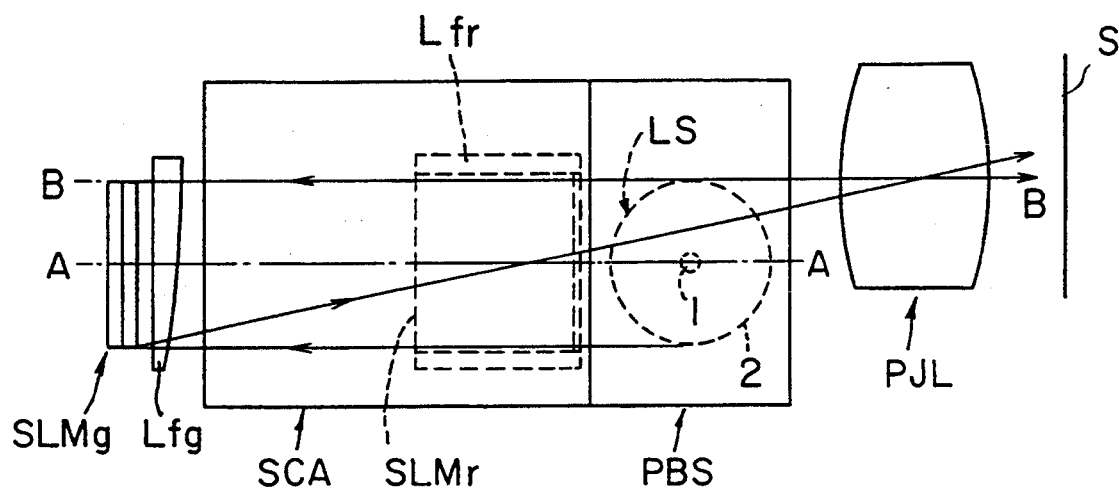
FIG. 5 is a side view showing a third embodiment of the optical system according to the present invention.

FIG. 5 is a side view showing a third embodiment of the optical system of the display apparatus. In the drawing, an optical system for shifting up lenses is shown such that the projection lens PJL is arranged so as to be shifted in the direction perpendicular no the optical axis A—A of the reflection type spatial light modulator SLMg (SLMr, SLMb), and further the field lens Lfg (Lfr, Lfb) is also shifted in the same direction. In this case, the projection lens PJL is shifted under the condition that both the principal planes of the field lens Lfg (Lfr, Lfb) disposed near the reflection type spatial light modulator SLMg (SLMr, SLMb) and the projection lens PJL are kept parallel to each other. In FIG. 5, the line B—B shows optical axes of the field lens Lfg (Lfr, Lfb) and the projection lens PJL. In the case of the optical system shown in FIG. 5, although both the axes match each other on the line B—B, it is possible to construct an optical system for shifting an image projected on the screen from the optical axes of the spatial light modulators to an optional position. By this optical system for shifting up the lenses, it is possible to easily adjust the position of display image projected on the screen S.

Figure 6:
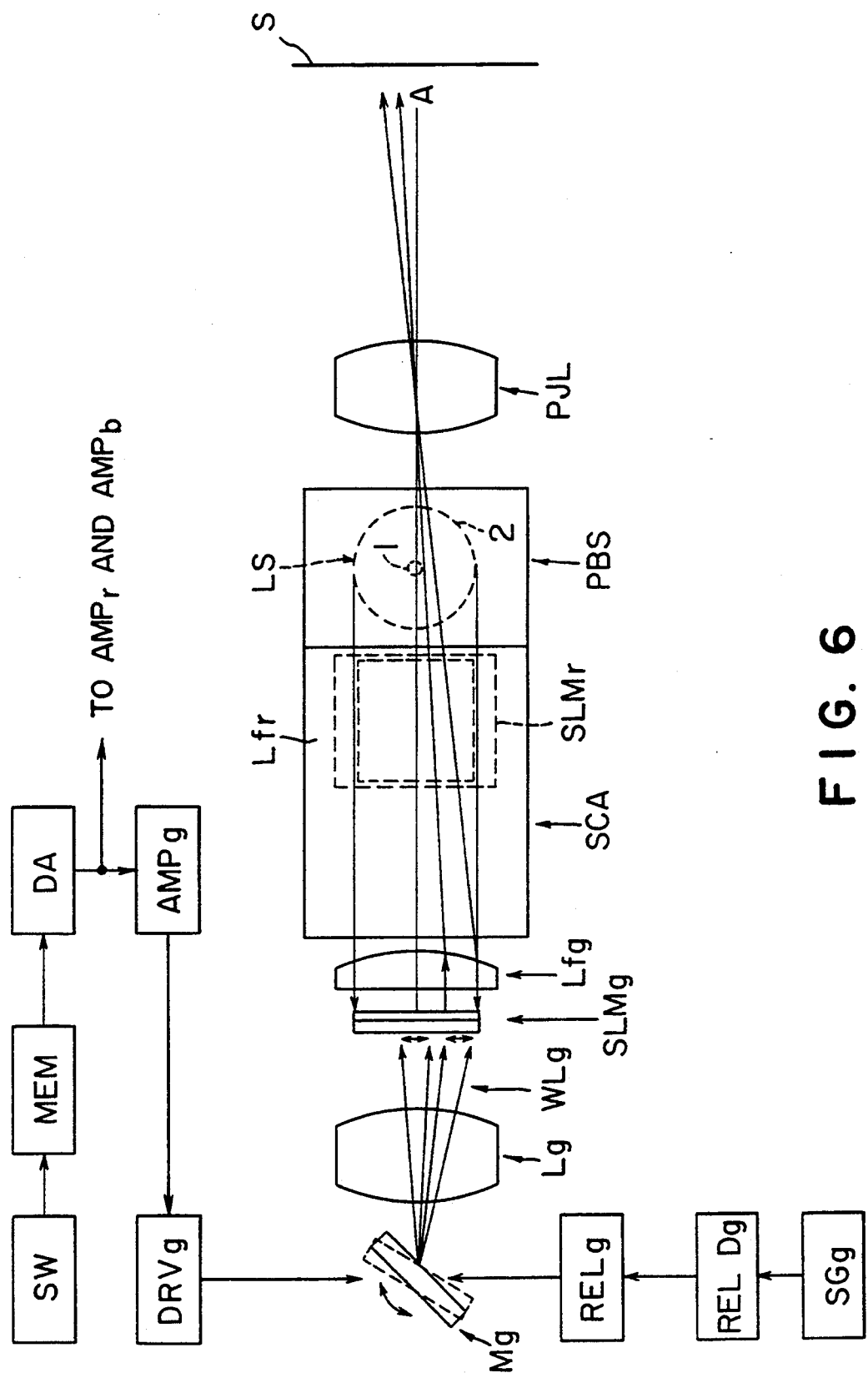
FIG. 6 is a diagrammatical view, partially block diagram showing an embodiment of the display apparatus using the optical system of the present invention.

In contrast with this, FIG. 6 shows another example of the optical system provided with the same function as with the case of the optical system shown in FIG. 5, in which an image written into the reflection type spatial light modulator is shifted from the optical axis of the field lens and the projection lens through an appropriate deflector.

In more detail, FIG. 6 is a side view of the optical system shown in FIG. 4, in which other composing elements as described below are additionally provided. That is, in addition to the composing elements of the display apparatus shown in FIG. 6, the optical system further includes a switch SW for outputting address data correlating with a projection angle of the image to the screen S (given by an operator); a memory circuit MEM for storing previously position data corresponding to the respective address data; a digital-analog convertor DA for converting the output of the memory circuit MEM to an analog signal; an amplifier AMPg for amplifying the analog signal; a driver circuit DRVg for outputting a deflector drive signal in response to the signal from the amplifier AMPg; a deflector Mg for changing the deflection angle of the light on the basis of the deflector drive signal; a signal source SGg for generating a signal representing a green component of the image; a driver circuit REL-Dg for outputting a drive signal on the basis of this green component; a light emitting element array RELg for outputting light representing the green component corresponding to one horizontal line of the image on the basis of the drive signal; and an image forming lens Lg for guiding the light deflected by the deflector Mg to the spatial light modulator SLMg as the write light WLg.

Further, in FIG. 6, there are omitted all the other amplifiers AMPr and AMPb; the driving circuits DRVr and DRVb; the deflectors Mr and Mb; the signal sources SGr and SGb; the driving circuits REL-Dr and REL-Db; the light emitting element arrays RELr and RELb: and the image forming lenses Lr and Lb, corresponding to red and blue components of the image, respectively.

In FIG. 6, when the position at which the image is displayed on the screen S is required to shift upward, for instance, the operator selects any desired projection angle through the switch SW. Then, the switch SW applies address data corresponding to this angle information to the memory circuit MEM. At the respective addresses of this memory circuit MEM, the position data for changing a position of the deflectors Mg, Mr and Mb (Mr and Mb are both not shown) according to the projection angles are previously stored. Therefore, in response to the applied address signal, these position data are read out of the memory circuit MEM successively, and then converted into analog signals through the digital-analog convertor D/A. Further, the converted drive signals are supplied to the drive circuits DRVg, DRVr and DRVb via the amplifiers AMPg, AMPr and AMPb, respectively.

Accordingly, on the basis of the drive signals applied from the respective drive circuits DRVg, DRVr and DRVb for the respective colors, the respective deflectors Mg, Mr and Mb deflect the lights emitted from the respective light emitting element arrays RELg, RELr and RELb for the respective colors toward the respective spatial light modulators SLMg, SLMr and SLMb. As the results, the image of the respective spatial light modulator are shifted from the axes of the field lens and projection lens. Therefore, it is possible to obtain color image through the above-mentioned optical system in the same way as with the case of the embodiment shown in FIG. 4 and display the obtained color image on the screen S.

As described above, it is possible to realize an optical system equivalent to the optical system for shifting up the lenses by changing the deflection angles of the write lights supplied to the respective spatial light modulators, without moving the field lens and the projection lens, and further to display the color image on any desired position on the screen.

What is claimed is:

1. An optical system for a display apparatus comprising:
   a light source for emitting read light;
   a reflection type spatial light modulator for modulating the read light incoming thereto in accordance with an image written thereon by write light;
   a projection lens for displaying the image by projecting the modulated light reflected from the reflection type spatial light modulator onto a screen; and
   a field lens provided between the reflection type spatial light modulator and the screen at such a position that both the read light and the modulated light can pass therethrough for focusing the modulated light on the projection lens near an entrance pupil of the projection lens so that intensity of the modulated light is increased.

2. The optical system of claim 1, which further comprises: a polarization beam splitter disposed between the field lens and the screen, for separating S polarized light from the read light, passing the separated S polarized light to the reflection type spatial light modulator for light modulation, and passing P polarized light included in the modulated light to the projection lens.

3. The optical system of claim 2, wherein said read light is composed of parallel light rays.

4. The optical system of claim 3, where in said field lens and said projection lens are positioned so as to shift optical axis thereof from optical axis of the reflection type spatial light modulator and the polarization beam splitter.

5. The optical system of claim 3, further comprising:
   deflection means for changing an incident angle of the write light upon the reflection type spatial light modulator in order to shift an optical axis of the image written by the write light from optical axis of the field lens and the projection lens.

6. A method of displaying an image by applying a read light to a reflection type spatial light modulator for generating a charge pattern corresponding to an image to be displayed, modulating the read light according to the charge pattern, and projecting the modulated light reflected from the reflection type spatial light modulator to a screen through a projection lens, comprising the steps of:

applying write light including an image to be displayed to the reflection type spatial light modulator to generate the charge pattern in the reflection type spatial light modulator;

separating S polarized light from the read light to apply the separated S polarized light to the reflection type spatial light modulator;

converging the modulated light reflected from the reflection type spatial light modulator on near an entrance pupil of the projection lens; and changing an incident angle of the write light upon the reflection type spatial light modulator according to a position at which an image is displayed on the screen.

* * * * *